Patented Jan. 19, 1926.

1,570,575

UNITED STATES PATENT OFFICE.

HERBERT RENNER, OF PHILADELPHIA, PENNSYLVANIA, ASSIGNOR, BY DIRECT AND MESNE ASSIGNMENTS, TO FOREST RESEARCH CORPORATION, OF PHILADELPHIA, PENNSYLVANIA, A CORPORATION OF DELAWARE.

PROCESS FOR DYEING WOOD.

No Drawing. Application filed October 26, 1923. Serial No. 670,890.

*To all whom it may concern:*

Be it known that I, HERBERT RENNER, a citizen of Germany, residing at Philadelphia, in the county of Philadelphia and State of Pennsylvania, have invented new and useful Improvements in Processes for Dyeing Wood, of which the following is a specification.

My invention relates to dyeing wood before its cellular structure is distorted by drying and seasoning. Wood is capable of taking certain dyes when they are applied in a definite way provided the wood contains substantially its full complement of moisture. In other words the wood to be successfully treated should contain a high water content.

Ideal conditions for such treatment are found in the living standing tree by making suitable incisions in its base, and feeding the dye thereto as it becomes absorbed by the cellular tissue. It is applicable also to the tree after cutting or to any green wood containing sufficient moisture in its cells.

To properly dye therefore the cellular tissue of wood the dye should be carried therein through the water content.

In carrying out my process I utilize any one or more of a large series of coloring metal compounds held in solution or suspension in water, such as molybdenum, copper, antimony, tin, iron, manganese, chromium, nickel, cobalt, uranium or the like. Combined therewith are volatile or unstable organic or inorganic chemicals, in solution or suspension, such as ammonia, formic acid, or the like. The reaction produced by these combinations, such as have been outlined, prepare them for diffusion with water through the cellular tissue of the wood. In effect, by these reactions, the insoluble suspensions form complex salts. Other chemical reactions take place.

The unstable chemicals outlined above may be either acids, bases or salts or compounds for oxidation or reduction.

The result of these mixtures is a solution which is stable under normal conditions of temperature and pressure for a certain period of time.

In the drying out of the wood by any of the known methods my improved stable mixtures (whatever the particular compound which was selected and injected into the wood) becomes stable and decomposes. The products of decomposition form chemical reactions either with each other or with the chemical components of wood. In this manner permanent dyes are deposited in and become fixed in the cell walls of the wood. This latter step is either chemical or physical or both.

To illustrate one concrete instance of the application of my invention I will describe the interstitial dyeing of the cellular structure of wood having a sap or water content with a color commonly called red brown.

I dissolve say 36 g. of ferric chlorid and 53 g. sodium acetate in water and add to this mixture 10 c. c. formic acid (25%). I then add water to 1000 c. c. An incision communiating with the cells of the wood is then made in the green or sap wood (in this case the incision is made in the base of a living tree). A tank containing this mixture is placed alongside the base of the tree, and a pipe is led therefrom to the incision tapping the cellular tissue.

The ferric chlorid and sodium acetate solution in water gives a red or red brown color. In this form it is a complex salt which is unstable in water because it decomposes into acetic acid and ferrichydroxid. But it becomes stable for a certain time by the addition of the formic acid which neutralizes the action of the water.

During the drying out of the wood which has been saturated with this solution the action of the formic acid ceases when the formic acid and acetic acid are voltatilized. The complex salt thereupon decomposes forming an insoluble red brown ferrichydroxid fixed in the cellular membrane of the wood.

I have found that the best results in the use of my process is in its application to the living tree as it stands, or before it is cut down.

I have heretofore indicated how my solution is applied to the living tree. The circulatory sap system, inlcuding the twigs and leaves under the influence of light and air carries my solution through and through the wood.

I arrange a series of incisions or borings (by saw, auger, or knife) which put my solution in contact with the entire cellular membrane structure of the tree at every point in a transverse section across the base of the tree.

I prefer in treating the tree as has been described to confine the sap to the roots below the point of introduction of the dyeing compound. The color flows in above this barricade and is drawn up to the very tips of the leaves by the pressure which is created when the moisture evaporates in the cells of the tree.

Having thus fully described my invention, what I claim is—

1. The process of dyeing wood which consists in combining with the sap through the cellular tissue of the wood a mixture of a coloring metal compound and a volatile or unstable chemical in solution or suspension forming complex salts for a time, and in the drying out of the wood then decomposing the complex salts and dyeing the wood by depositing permanent dyes fixed in the cells of the wood.

2. A preparation for coloring wood, comprising a coloring metal compound and a volatile or unstable chemical in solution or suspension; such components, when combined with the sap through the cellular tissue of the wood, forming complex salts for a time, but in drying out of the wood decomposing and dyeing the wood by depositing permanent dyes fixed in its cells.

Dr. HERBERT RENNER.